Sept. 13, 1938.  G. D. SIMONDS  2,129,970
UNDERBODY SCRAPER INSTALLATION
Filed April 30, 1936   2 Sheets-Sheet 1
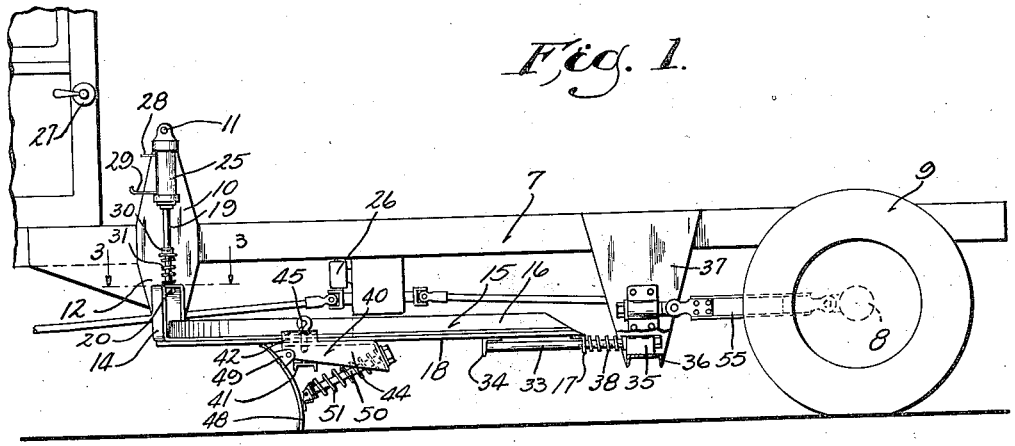
INVENTOR
George Douglas Simonds
BY Wheeler, Wheeler & Wheeler
ATTORNEYS Sept. 13, 1938.  G. D. SIMONDS  2,129,970
UNDERBODY SCRAPER INSTALLATION
Filed April 30, 1936  2 Sheets-Sheet 2
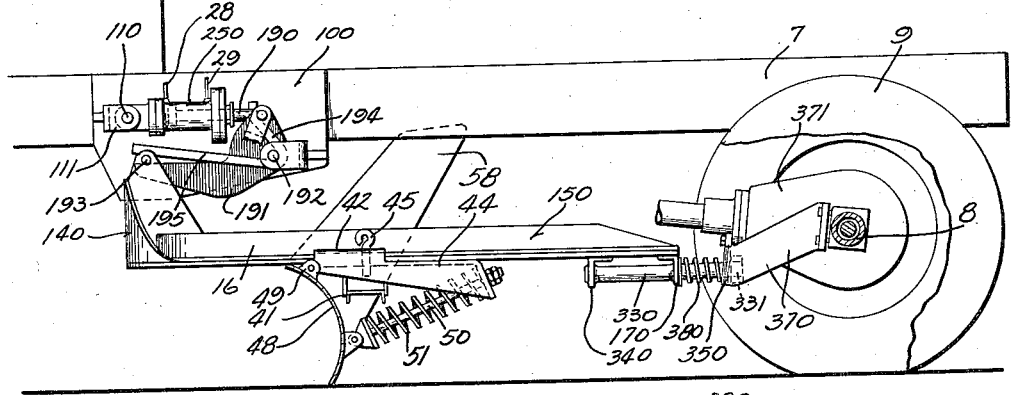
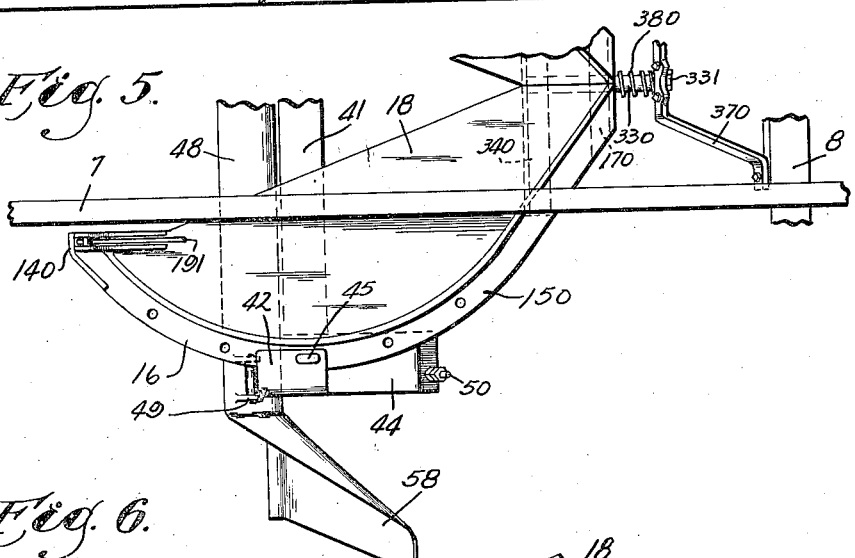
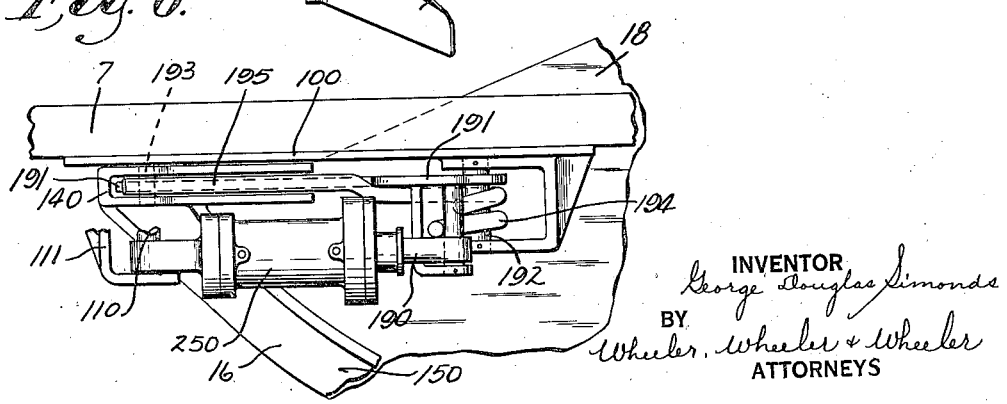
INVENTOR
George Douglas Simonds
BY
Wheeler, Wheeler & Wheeler
ATTORNEYS Patented Sept. 13, 1938

2,129,970

UNITED STATES PATENT OFFICE 2,129,970

UNDERBODY SCRAPER INSTALLATION

George Douglas Simonds, Clintonville, Wis., assignor to Four Wheel Drive Auto Company, Clintonville, Wis., a corporation of Wisconsin Application April 30, 1936, Serial No. 77,129

11 Claims. (Cl. 37—159)

This invention relates to improvements in underbody scraper installations.

The invention has for its objects the provision of a novel and simple sub-frame mounting for a scraper plow blade, wherein the blade is tiltable yieldably with respect to its mounting, and the mounting as a whole is not only adjustable under pressure to and from the road surface, but is also yieldable longitudinally of the vehicle to absorb shocks pending the tilting movement of the blade.

More specifically, it is an object of the invention to provide a novel and improved sub-frame upon which the blade is angularly adjustable, the sub-frame being substantially floated beneath the body of a vehicle and provided with connections not merely to the vehicle frame but to the rear axle thereof, whereby the thrust of the rear wheels is transmitted directly to the sub-frame instead of being wholly transmitted through the springs and main frame of the vehicle.

In the drawings:

Figure 1 is a partial diagrammatic view in side elevation showing the application of my invention to a truck or like vehicle.

Figure 2 is a plan view of the installation shown in Figure 1.

Figure 3 is a detail view on an enlarged scale taken on the section indicated at 3—3 in Figure 1.

Figure 4 is a fragmentary side elevation showing a modified installation.

Figure 5 is a fragmentary plan view showing a portion of the installation illustrated in Figure 4.

Figure 6 is a plan view on an enlarged scale showing in plan details of the operating mechanism and connections.

Figure 7 is a diagrammatic view illustrating the hydraulic connections.

Like parts are identified by the same reference characters throughout the several views.

The main frame of the vehicle is illustrated at 7, its rear axle being shown at 8, and its rear wheels at 9.

Secured to the sides of the vehicle frame 7 are the plates 10 connected at their upper ends by a cross bar 11 and projecting below the frame at 12 to receive the lateral thrust of the bearing members 14 from the ends of the sub-frame 15.

The sub-frame 15 comprises angle iron rails 16 having opposing arcuate portions of like radius, as clearly appears from Fig. 2, and thence converging tangentially toward the thrust block 17. Webs 18 sub-tend the arcs of the rails 16 and extend directly from the bearing members 14 at their free ends to the thrust block 17, thus stiffening the entire sub-frame.

The forward ends of the rails 16 of the sub-frame are supported by piston rods 19 slidable through the bearing elements 14 and headed at 20 for interior engagement therewith. The piston rods 19 operate in hydraulic jack cylinders 25 resting against the respective side plates 10 and fulcrumed upon the cross bolt 11, these cylinders being operatively supplied either above or below the pistons with oil pressure developed in a pump 26 and controlled by a valve 27 at the cab for selective delivery through the pipes 28 or 29 to the top or bottom of the cylinders 25 respectively, the pipes being illustrated diagrammatically. Each of the piston rods 19 is equipped as shown in Fig. 1 with a collar 30 formed in a seating for compression spring 31 which engages the upper surface of bearing element 14 so that the downward pressure of the hydraulic jack upon the sub-frame is applied yieldingly thereto, the forward end of the sub-frame being free to spring upwardly in the event that the scraper blade hereinafter to be described encounters an obstacle.

Relief valves 32 are preferably used between each of the lines 28 and 29, and the oil reservoir 320 from which the pump 26 draws its oil through the pipe 321. There is a separate return lead 322 from the valve 27 which is connected in the usual way by the valve with either the oil line 28 or the oil line 29 when pressure is being applied to the other line. This permits the exhaust back to the reservoir of the oil confined in the idle end of each cylinder 25 at the time the pressure is being applied to the other end thereof.

Fittings 14 are in the nature of links slidably engaged over the heads 20 of the piston rods 19 to permit the sub-frame 15 a certain degree of bodily upwardly yielding movement.

At its rear end the sub-frame 15 carries a bar 33 fixed in a cross plate 34 and projecting through the thrust block 17. This bar has a bearing in the complementary thrust block 35 on the transverse member 36 of a bracket 37 rigidly applied to the vehicle frame. Between the thrust blocks 17 and 35 is a powerful compression spring 38 which normally holds the sub-frame in the position illustrated but allows the sub-frame a substantial degree of bodily rearward yielding movement in the event an obstacle is encountered.

Angularly adjustable on the sub-frame 15 is a scraper carriage generically designated by reference character 40 and comprising a transverse member 41 having hooked fittings 42 at its ends engaged over the flanges of the angle iron rails 16 and having rearwardly extending arms 44.

Pins 45 are dropped through suitable openings in the hooked fittings 42 into corresponding apertures 46 spaced about the flanges of rails 16, whereby the carriage 40 may be fixed at any desired angle with reference to the path of movement of the vehicle.

The blade 48 is provided with ears 49 fulcrumed upon fitting 40, and is also provided with guide pins 50 in pivotal connection with the lower end portions of the blade and extending through the ends of the arms 44. Upon these guide pins are compression springs 51 which normally maintain the blade in the position of inclination indicated in Fig. 1, but permit the blade to yield upon the fulcrum provided by its ears 49 to clear an obstruction in the road. In the event that such an obstruction is encountered any shock to the vehicle is avoided by the arrangement which permits the entire sub-frame 15 to yield against the compression of spring 38 as above described.

To prevent the brackets 37 from being torn from the vehicle frame 7, I prefer that these brackets be braced directly from the rear axle 8. This can conveniently be done by the heavy links 55 which connect the opposite ends of axle 8 with the downwardly depending brackets 37 so that some of the driving force developed by the wheels is transmitted directly to the brackets 37 in the thrust block 35 without necessarily passing through the vehicle frame 7.

In the construction shown in Figs. 4, 5 and 6, the hydraulic jack cylinders 250 are mounted horizontally upon the plate 100, being pivotally connected therewith upon the pintle 110 carried by bracket 111. The pressure developed upon each piston rod 190 is transmitted through a bell crank 191 fulcrumed at 192 to the cross pin 193 of the hanger 140 which serves as a bearing element at the end of the sub-frame 150. This sub-frame is substantially the same as the sub-frame shown in Figs. 1, 2 and 3.

Oil pressure applied to the cylinders 250 through the pipe 28 will act through the bell crank 191 upon the sub-frame to lift the scraper plow from the road surface. Oil pressure applied in the opposite direction through pipe 29 will move the piston and piston rod 190 to the left as viewed in Fig. 4 and Fig. 6, thereby acting through the torsion spring 194, one arm 195 of which bears from above upon the pin 193, this spring serving a function similar to that of spring 31 in Fig. 1. The pin 193 rides between the upper surface of the rocker arm 191 and the under surface of the spring arm 195 to permit of the bodily forward and backward movement of the sub-frame 150 with respect to the frame 7 and the truck without in any way interfering with the operative relation of the pin 193 to the spring and the rocker arm.

The area of the piston rod 190 reduces the effective cross section of the piston which is exposed to pressure from pipe 29 as compared with the total piston area exposed to pressure from pipe 28. This automatically reduces the pressure exerted in a downward direction through the torsion spring upon the sub-frame as compared with the pressure which is available for oscillating the bell crank 191 in a direction to raise the sub-frame, this being a desirable feature.

In the construction shown in Figs. 4, 5 and 6, I omit altogether the bracket plates 37 connected with the truck frame, and in lieu thereof I mount the sub-frame directly from the rear axle 8 by means of a bracket 370 which is U-shaped and dropped at the front to clear the differential housing 371. The arms of this bracket are clamped or bolted to the axle and it provides in its forward portion 350 a bearing for the bar 330 which is carried by the thrust element 170 and anchorage 340 of the sub-frame. The compression spring 380 holds the sub-frame forward to the full extent permitted by the nut 331 on the bar 330. From this forward position the sub-frame can yield bodily against the compression of spring 380 just as in the construction shown in the first three views of the drawings.

The scraper blade 48 is mounted on a carriage in the same manner as that above described and tilts against the compression of spring 51. In each of my improved mountings bolts are desirably provided at their ends with channel-shaped upwardly and rearwardly extending spouts at 58 for the delivery of material scraped from the road surface.

In both of the constructions herein disclosed I have shown a sub-frame which floats for bodily yielding movement both horizontally and vertically and yet is provided with hydraulic operating connections. In each case the scraper blade itself is mounted on a carriage angularly adjustable respecting the floating sub-frame, and the blade is tiltable against spring pressure with respect to the carriage and the sub-frame. In both constructions there is provision for a yielding motion transmitting connection directly from the rear axle to the sub-frame to relieve the main vehicle frame and springs of shocks incident to the operation of the scraper. In both of the constructions disclosed the attachment of the device to a conventional truck chassis is a comparatively simple matter. Thus the apparatus may readily be installed on existing vehicles, and its use is not limited to new production.

I claim:

1. In a device of the character described, a sub-frame comprising opposed complementary arcuate frame elements having corresponding ends free and having their opposite ends extended and connected, means spanning the arc of each such element for the reinforcement thereof, a sliding support for the connected ends of said elements, and means against which the free ends of said elements are engaged to resist lateral displacement.

2. In a device of the character described, the combination with a pair of mounting plates applicable to opposite sides of a vehicle chassis, of a cylinder in pivotal connection with each such plate, a piston operating in each cylinder, a sub-frame having means guiding it against lateral displacement with respect to said plates and including supporting connections from the respective pistons for the actuation of said sub-frame in at least one direction, said connections including mechanism for accommodating the longitudinal movement of the sub-frame, and bracket means for the support of the rear end of the sub-frame including an abutment element, a sliding bearing connection between said sub-frame and said abutment, a spring operatively connected to oppose the rearward movement of the sub-frame, and a scraper blade operatively mounted upon the sub-frame between the bracket and said connections.

3. In a device of the character described, a frame comprising flanged frame elements having complementary arcuate portions, a plate spanning the arcuate portion of each such element, and means connecting said elements, in combination with a carriage comprising hooked supports engaged over the opposed flanges of the respective elements for angular adjustment thereon, means for securing each of said hooked supports individually in adjustment upon its respective element, and a scraper blade mounted on said carriage to partake of the adjustment thereof, each such support including a rearwardly extending arm, spring guide means extending from said blade to said arm, and compression springs upon said guide means abutting the respective arms and opposing the tilting movement of the blade, the connection between the blade and the aforesaid carriage supports comprising fulcrumed pins upon which the blade is tiltable.

4. In a device of the character described, the combination with a vehicle frame and driving axle spring supported therefrom, of a sub-frame, a scraper mounted on the sub-frame, a folding support from the vehicle frame for the forward end of the sub-frame with respect to which support said sub-frame is yieldable vertically and longitudinally of said vehicle frame, a support for the rear end of said sub-frame upon which said sub-frame is yieldable longitudinally of the vehicle frame, brace means from said last mentioned support directly to said axle, and a compression spring opposing the longitudinal movement of said sub-frame respecting said axle.

5. The combination with a vehicle frame, of a sub-frame therebeneath having spaced forwardly projecting elements, means pivotally supporting the rear end of the sub-frame, rigid guide means carried by said frame embraced by said elements and upon which said elements bear in opposite directions to resist lateral displacement while accommodating relative vertical movement between said frames, and a scraper plow mounted on said sub-frame between said supporting means and said bearing means.

6. The combination with a vehicle frame, of a sub-frame therebeneath, a rear support for the sub-frame including means providing for the longitudinal movement of the sub-frame on said support and including a spring resisting rearward movement of the sub-frame respecting the vehicle frame, jack means for adjusting the front end of the sub-frame vertically respecting the vehicle frame and including a connection to the sub-frame accommodating the longitudinal movement thereof, and a blade mounted transversely of the sub-frame intermediate said support and said jack means, said sub-frame having a bifurcated front end portion and said vehicle frame having rigid lateral thrust members against which said bifurcated front portion bears.

7. The combination with a vehicle frame, of a sub-frame therebeneath, a rear support for the sub-frame including means providing for the longitudinal movement of the sub-frame on said support and including a spring resisting rearward movement of the sub-frame respecting the vehicle frame, jack means for adjusting the front end of the sub-frame vertically respecting the vehicle frame and including a connection to the sub-frame accommodating the longitudinal movement thereof, and a blade mounted transversely of the sub-frame intermediate said support and said jack means, said jack means comprising a pivoted cylinder and a piston yieldably connected with said sub-frame.

8. The combination with a vehicle frame, of a sub-frame therebeneath, a rear support for the sub-frame including means providing for the longitudinal movement of the sub-frame on said support and including a spring resisting rearward movement of the sub-frame respecting the vehicle frame, jack means for adjusting the front end of the sub-frame vertically respecting the vehicle frame and including a connection to the sub-frame accommodating the longitudinal movement thereof, and a blade mounted transversely of the sub-frame intermediate said support and said jack means, said jack means comprising a cylinder, a piston, a rocker arm with which the piston is connected and upon which the front end of the sub-frame is mounted for longitudinal sliding movement, and a spring yieldably holding the sub-frame to said arm.

9. In a device of the character described, the combination with a rear bracket, of a floating sub-frame having rearwardly converging frame elements, means providing a sliding bearing between said sub-frame and said bracket at the apex of said elements, a spring yieldably opposing the rearward movement of said sub-frame upon said bearing, a blade disposed transversely of said sub-frame and adjustable upon the individual elements thereof for variation as to angle, and means for adjustably supporting a forward portion of said sub-frame, said bearing accommodating pivotal as well as sliding movements of the sub-frame.

10. In a device of the character described, the combination with a vehicle frame and a bracket depending therefrom, of a sub-frame beneath the vehicle frame comprising laterally spaced arcuate elements having rearward extensions converging to an apex near said bracket, a rod disposed longitudinally of the main frame and provided with means for a sliding bearing support of the said apex from said bracket, a spring opposing the rearward sliding of the sub-frame along the axis of said rod, said bracket being provided with means to receive the thrust of said spring, lateral thrust plates carried by the vehicle frame and engaged by the forward portions of said sub-frame elements, and means at opposite sides of the vehicle frame for adjustably supporting said sub-frame, said sub-frame being provided with a transverse blade between said supporting means and said apex.

11. In a device of the character described, the combination with a vehicle frame, of a sub-frame therebeneath, means for yieldably supporting the rear end of the sub-frame for movement longitudinally of the vehicle frame, means for resiliently opposing such movement in a relative rearward direction, sub-frame supports pivotally connected with opposite sides of the vehicle frame and comprising bell cranks having longitudinally extending arms, means connected with the sub-frame slidably mounted on said arms to transmit vertical movement to the sub-frame in the oscillation of the bell cranks while accommodating the longitudinal yielding movement of the sub-frame, and means for oscillating the respective bell cranks to control the sub-frame position, said sub-frame being provided with a road working blade.

GEORGE DOUGLAS SIMONDS.